(12) United States Patent
Murphy et al.

(10) Patent No.: US 7,941,538 B2
(45) Date of Patent: May 10, 2011

(54) DYNAMIC MANAGEMENT OF RESOURCE UTILIZATION

(75) Inventors: Grant Charles Murphy, Labrador (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/138,152

(22) Filed: Jun. 12, 2008

(65) Prior Publication Data
US 2009/0313374 A1 Dec. 17, 2009

(51) Int. Cl.
*G06F 15/173* (2006.01)

(52) U.S. Cl. ........ 709/226; 709/227; 709/229; 370/252; 705/8; 705/30

(58) Field of Classification Search .......... 709/226–228; 705/8, 30; 370/252
See application file for complete search history.

(56) References Cited

U.S. PATENT DOCUMENTS

| 6,553,461 | B1 | 4/2003 | Gupta et al. | |
| 6,701,316 | B1 * | 3/2004 | Li et al. | 370/395.41 |
| 7,130,890 | B1 | 10/2006 | Kumar et al. | |
| 2002/0083178 | A1 * | 6/2002 | Brothers | 709/226 |
| 2003/0115118 | A1 * | 6/2003 | Reinemann | 705/30 |
| 2004/0098249 | A1 * | 5/2004 | Wang et al. | 704/9 |
| 2004/0111491 | A1 * | 6/2004 | Raja et al. | 709/219 |
| 2005/0033794 | A1 * | 2/2005 | Aridor et al. | 709/200 |
| 2005/0138426 | A1 * | 6/2005 | Styslinger | 713/201 |
| 2007/0156845 | A1 | 7/2007 | Devanneaux et al. | |
| 2009/0077233 | A1 * | 3/2009 | Kurebayashi et al. | 709/224 |

OTHER PUBLICATIONS

Jiang et al., "Web Prefetching in a Mobile Environment", IEEE Personal Communications, Oct. 1998, pp. 25-34.
Nair et al., "Improving Performance of World Wide Web by Adaptive Web Traffic Reduction", Proceedings of World Academy of Science, Engineering and Technology, vol. 17, Dec. 2006, pp. 123-128.

* cited by examiner

*Primary Examiner* — Wing F Chan
*Assistant Examiner* — Razu A Miah
(74) *Attorney, Agent, or Firm* — Yee & Associates, P.C.; Libby Z. Toub

(57) ABSTRACT

In accordance with an illustrative embodiment of the present invention, a computer implemented method for dynamic management of resource utilization is provided. The computer implemented method monitors data flows of a reverse proxy web server, and determines whether a resource utilization of the reverse proxy web server exceeds a first threshold. The computer implemented method further, responsive to a determination that the resource utilization does not exceed a first threshold, determines whether the resource utilization exceeds a second threshold, responsive to a determination that the resource utilization does exceed a second threshold, filters pre-fetch directives inversely by frequency.

12 Claims, 3 Drawing Sheets

DYNAMIC MANAGEMENT OF RESOURCE UTILIZATION

BACKGROUND OF THE INVENTION

1. Field of the Invention

The present invention relates generally to an improved data processing system and, more specifically, to a computer implemented method, an apparatus, and a computer program product for dynamic management of resource utilization in a reverse proxy web server.

2. Description of the Related Art

Hyper Text Markup Language (HTML) is the publishing language used to create much of the material available on the World Wide Web. The Hyper Text Markup Language 4.01 Specification is a W3C Recommendation dated 24 Dec. 1999 and is available from the World Wide Web Consortium web site at www.w3.org. The Hyper Text Markup Language 4.01 specification defines a mechanism, for browsers, called link pre-fetching. Various link types are defined within the Hyper Text Markup Language specification When a browser recognizes the <link rel="prefetch" . . . > or <link rel="next" . . . > tags in the header section of the Hyper Text Markup Language document, the browser can choose to preload the content in an effort to enhance the users experience. The pre-fetched data is typically linked directly to the user's current context within the web site. By retrieving content which is linked to the current page during periods when the user is idle, such as when reading a web page and not requesting new pages the user experiences shorter delays when the user chooses to move to a different context. A typical use of this feature of the Hyper Text Markup Language specification by a web application developer is to include pre-fetch directives on selected web pages for the pages the developer believes would most commonly be accessed from the selected web pages. If the web application developer makes incorrect assumptions about the user access patterns of the application, an unnecessary amount of resource may be consumed or wasted by pre-fetching pages that the user is not likely to view. In a typical enterprise environment where a number of applications are served through a central proxy infrastructure, such as Tivoli® Access Manager WebSEAL, available from International Business Machines Corporation or Microsoft® ISA Server, available from Microsoft Inc., operational issues may be introduced through the use of the link tag. For example, individual applications may use link pre-fetching in such a way that pre-fetching places too much load on the reverse proxy web server. The additional load may reduce the ability of the reverse proxy web server to respond efficiently to requests across all of the web applications that the reverse proxy web server is configured to route.

A number of attempts to resolve the problems just described have been implemented. The attempted solutions include web developers iteratively modifying the use, by the web application, of the pre-fetching link tags to be suitable for the peak loads experienced on the site. This approach is reactive and susceptible to the same issues when the usage patterns change. In production environments, formal change control procedures could extend the time required to implement a change to tune the environment. In another example, a recommendation was made to avoid the use of the link tags, and forgo the performance and user experience improvements gained by pre-fetching content. In yet another example, a proposed implementation avoids the use of a reverse proxy web server and loses the benefits inherent in reverse proxy technology such as isolation and centralized security management.

BRIEF SUMMARY OF THE INVENTION

According to one embodiment of the present invention, a computer implemented method for dynamic management of resource utilization is provided. The computer implemented method monitors data flows of a reverse proxy web server, and determines whether a resource utilization of the reverse proxy web server exceeds a first threshold. The computer implemented method further, responsive to a determination that the resource utilization does not exceed a first threshold, determines whether the resource utilization exceeds a second threshold, and responsive to a determination that the resource utilization does exceed a second threshold, filters pre-fetch directives inversely by frequency.

In accordance with another embodiment, a data processing system for dynamic management of resource utilization is provided. The data processing system comprises a bus, a memory connected to the bus, wherein the memory comprises computer-executable instructions, a communications unit connected to the bus, a display connected to the bus, and a processor unit connected to the bus, wherein the processor unit executes the computer-executable instructions to direct the data processing system to: monitor data flows of a reverse proxy web server, determine whether a resource utilization exceeds a first threshold, responsive to a determination that the resource utilization does not exceed a first threshold, determine whether the resource utilization exceeds a second threshold, and responsive to a determination that the resource utilization does exceed a second threshold, filter pre-fetch directives inversely by frequency.

In accordance with another embodiment, a computer program product for dynamic management of resource utilization is provided. The computer program product comprises computer-readable recordable-type medium tangibly embodying computer-executable instructions thereon. The computer-executable instructions comprise computer-executable instructions for monitoring data flows of a reverse proxy web server, computer-executable instructions for determining whether a resource utilization of the reverse proxy web server exceeds a first threshold, computer-executable instructions responsive to a determination that the resource utilization does not exceed a first threshold, for determining whether the resource utilization exceeds a second threshold, and computer-executable instructions responsive to a determination that the utilization does exceed a second threshold, for filtering pre-fetch directives inversely by frequency.

DETAILED DESCRIPTION OF THE INVENTION

Figure 1:
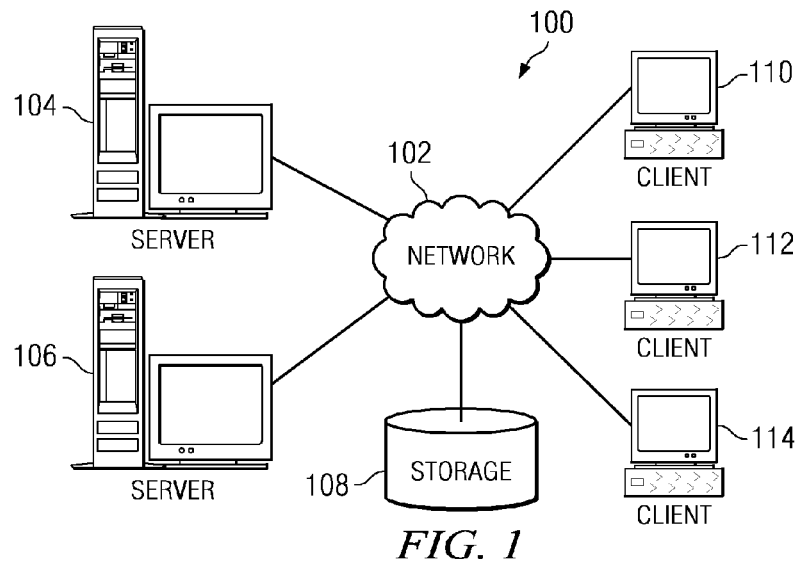
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
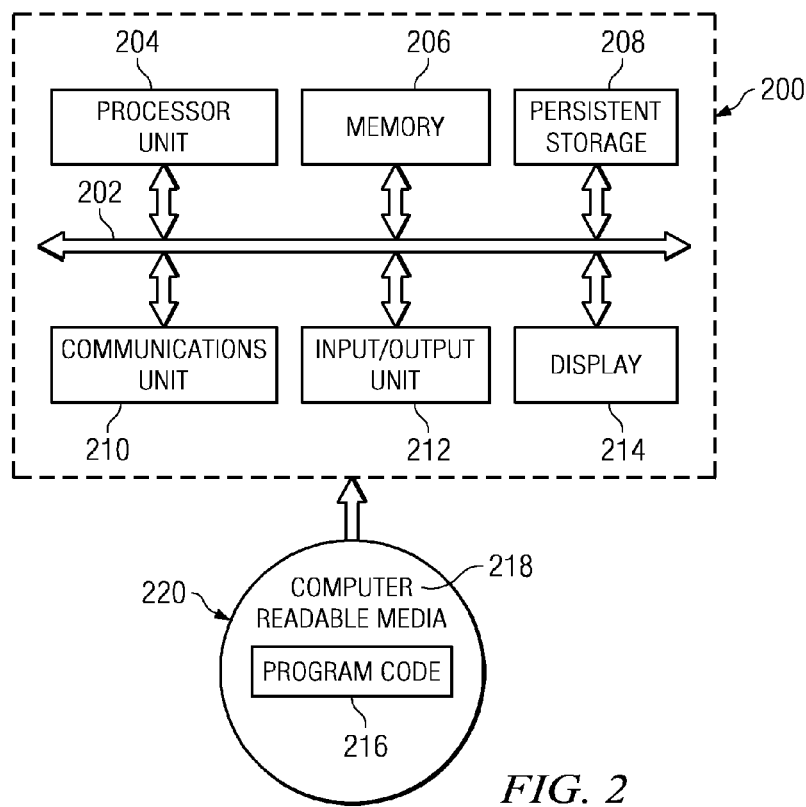
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

For example, using system 100 of FIG. 1, dynamic management of resource utilization in a reverse proxy web server may be provided. Resource utilization is a form of consumption measurement in which a portion of a resource capacity has been consumed in the process of performing work. Resource utilization metrics can be obtained from a number of resources comprising the number of concurrent/active user sessions and the backlog of requests, as well as machine-level characteristics such as the processor, memory or network bandwidth utilization A reverse proxy web server may be located on server 106 to front-end an application server on server 104. Application server 104 provides application data of interest to a client 110. Client 110 requests information from application server 104 through reverse proxy web server on server 106 by way of network 102. An extended reverse proxy web server with pre-fetch filtering extensions, monitors data flows, and determines whether resource utilization on the extended reverse proxy web server exceeds a first threshold. Responsive to a determination that the resource utilization does not exceed a first threshold, the extended reverse proxy web server determines whether the resource utilization exceeds a second threshold, and responsive to a determination that the resource utilization does exceed a second threshold, filters pre-fetch directives inversely by frequency. The extended reverse proxy web server thereby dynamically adjusts the loads associated with pre-fetch links based on the resource utilization of the reverse proxy web server.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
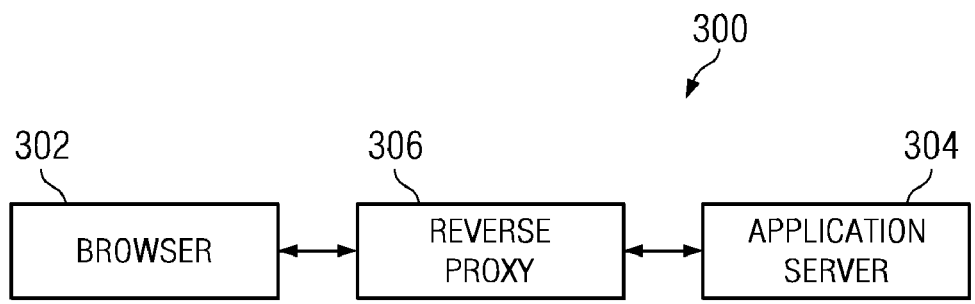
FIG. 3 is a block diagram of a typical browser, reverse proxy web server, and application server system, in accordance with illustrative embodiments.

With reference to FIG. 3 a block diagram of a typical browser, reverse proxy, and application server system is shown, in accordance with illustrative embodiments. The system 300 may be composed of elements as shown in FIG. 1. For example, browser 302 may be implemented on client 110. Reverse proxy 306 may be implemented on server 104. Application server 304 may be implemented on server 106. The simple diagram shows the flow of data in relation between the browser 302 through the proxy server 306 and the application server 304. While shown separately in the example figure, reverse proxy 306 and application server 304 may also reside on the same physical machine. The proxy server 306 including extensions form the extended reverse proxy 400 of FIG. 4.

Reverse proxy 306 is located between the client and the application server to provide a performance boost or other processing enhancement to the application and client interaction. The performance boost in this example is due to pre-fetching of web pages for the client. Reverse proxy 306 may offload some of the processing normally handled by application server 304.

Figure 4:
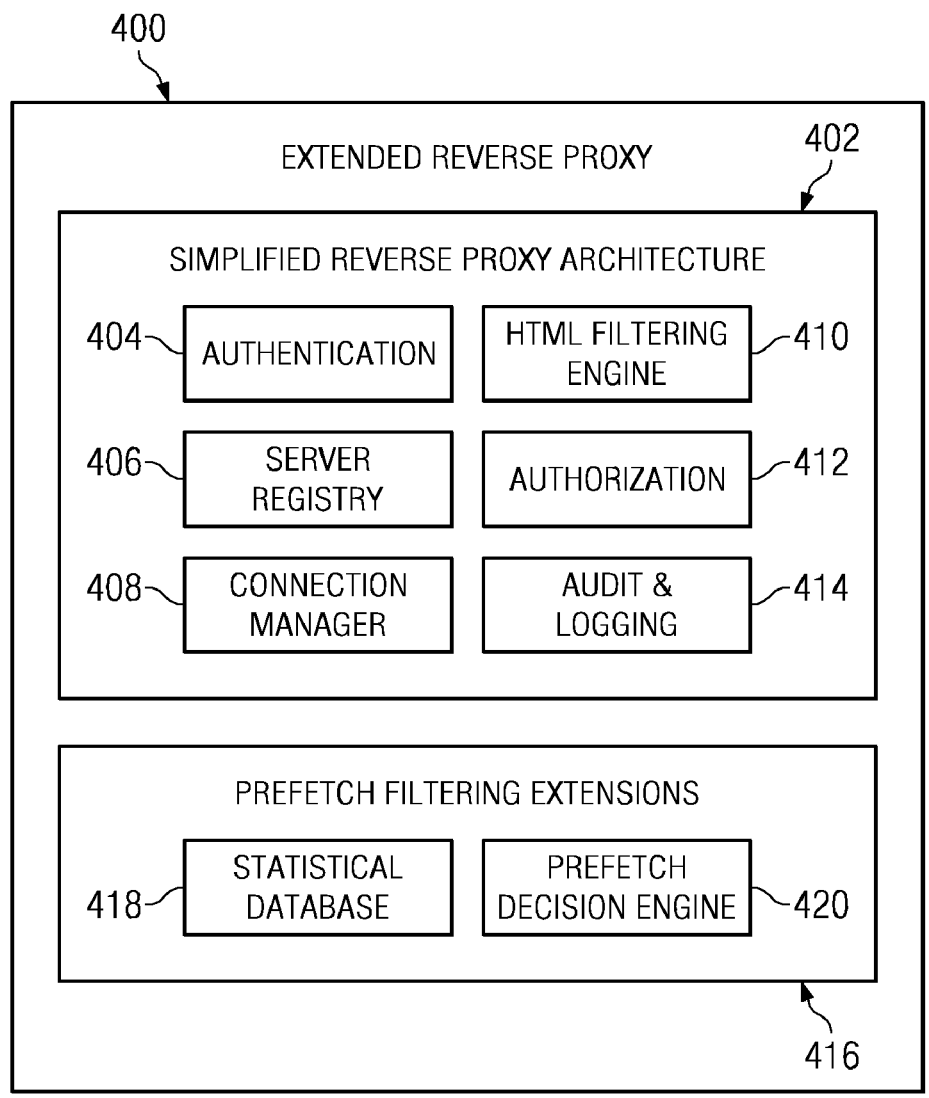
FIG. 4 is a block diagram of components of pre-fetch extensions to a reverse proxy web server, in accordance with illustrative embodiments.

With reference to FIG. 4, a block diagram of components of pre-fetch extensions of a reverse proxy web server, in accordance with illustrative embodiments is shown. Extended reverse proxy 400 is composed of two main components, simplified reverse proxy architecture 302 and pre-fetch filtering extensions 316.

Simplified reverse proxy architecture 402 is further comprised of a number of related sub-components. The sub-components include the following set of components, but are not limited to those listed, such as a service for authentication 404, a server registry 406, a connection manager 408, a hypertext markup language (HTML) filtering engine 410, a service for authorizations 412, and a service for audit and logging 414.

The simplified reverse proxy architecture 402 portion of extended reverse proxy 400 provides a framework within which the sub-components function. The simplified reverse proxy also provides an operational package for ease of maintenance. Throughout the remainder, the terms reverse proxy and reverse proxy web server will have the same meaning and be used interchangeably.

Authentication 404 provides a service for the performance of authenticating users or other components requesting access to functions provided by the reverse proxy web server. Server registry 406 provides a focal point for servers that are accessed through the reverse proxy. For example, if the reverse proxy web server is a viewed as a concentrator, the server registry would provide the identifiers of the associated servers attached to the concentrator.

Connection manager 408 provides a capability to manage the data connections with the various servers for which the typically reverse proxy web server acts a front end. Connections are also managed between the reverse proxy web server and the clients because the reverse proxy web server acts as a focal point for the client interaction. Clients may not be aware of the number and type of servers behind the reverse proxy.

HTML filtering engine 410 provides a capability to effectively manage Hypertext Markup Language requests for services using, in this example, link tags. The filtering engine determines which Hypertext Markup Language link tags to allow or disallow based on predetermined and dynamic criteria.

A service for authorizations 412 provides a capability to permit access to a resource managed by the reverse proxy. An authorization is typically required to modify the settings of the reverse proxy. The authorizations of interest deal with the resources of the reverse proxy web server and not other resources such as those of the application server.

A service for audit and logging 414 provides a capability to track events or changes that occur on the reverse proxy. Record keeping may also be performed.

Pre-fetch filtering extensions 416, a component of extended reverse proxy 400, provides services from additional components of a statistical database 418 and a pre-fetch decision engine 420. Statistical database 418 provides a repository for collecting information on the resource utilization of the servers and links. The information collected may then be analyzed to provide usage statistics. The usage statistics are used to compare with thresholds of performance criteria within the pre-fetch decision engine 420. For example, information may be compared between a number of active sessions using the reverse proxy web server and a predefined threshold for active sessions in the pre-fetch decision engine to determine adding or reducing pre-fetch link operations. Typical reverse-proxy web server specific metrics can be obtained from a number of resources comprising the number of concurrent/active user sessions and the backlog of requests, as well as machine-level characteristics such as the processor, memory or network bandwidth utilization.

Illustrative embodiments provide an example implementation in which self-optimization and context awareness are used to achieve equilibrium between user experience and capabilities of the deployed infrastructure. Both real-time and observed data on the usage of reverse proxy web server 306 of FIG. 3 and/or utilization of the machine on which it runs comprise resource utilization information. The resource utilization information is used to determine which link pre-fetching tags directives are filtered, and how many and how many tags are filtered, in the responses from the web applications. The data used to make this determination could be based on one of a set of resource utilizations of reverse proxy web server 306 including a number of active sessions or user sessions, or a number of pending requests handled by the reverse proxy web server for or to the web-based applications. In another example, usage statistics may be obtained for processor utilization or memory utilization of the server machine itself or for network utilization as seen from the reverse proxy. The resource utilization information is collected to form resource usage in statistical database 418 of FIG. 4.

For a given implementation, it is expected that a subset of the metrics above would be used, based on the capabilities of reverse proxy web server 306 and the operating system on which it runs. One or more of these metrics would be combined to provide a real-time measure of the resource utilization of the reverse proxy.

The extent to which link tags are used, or filtered out of the Hyper Text Markup Language response, by reverse proxy web server 306 will be determined by operational thresholds and the metrics that are being monitored in real-time. For example, when the observed resource utilization of reverse proxy web server 306 is less than a predetermined lower limit, then a determination is made by prefetch decision engine 420 to not filter or remove any link tags from the Hyper Text Markup Language responses from the web-based applications. The inference is in this case that enough resources are available to accommodate the additional resource consumed by the pre-fetching requests.

In another example, when the observed utilization of reverse proxy web server 306 is greater than a predefined upper limit, then filter all link tags from the Hyper Text Markup Language responses from the web-based applications. In this example, the resource utilization has almost reached the maximum capacity. An attempt to reduce the load is made by removing all pre-fetching operations.

Additionally, reverse proxy web server 306 commences recording of data of web resources accessed from others. The captured data is then stored in statistical database 418 for subsequent processing. This information could be based on data available in the hypertext transport protocol (HTTP) header of the referrer.

The collection of this data may typically be based on a configurable sliding time window established as part of the service of statistical database 418. The sliding time window ensures only recent data about user access patterns is used for determining which link pre-fetching directives are filtered. Old data may be overwritten as a means of removing the older material and not using old data in calculations.

When the observed resource utilization of reverse proxy web server 306 is between the lower and upper bounds, filtering of the link tags by HTML filtering engine 410 may be performed inversely by frequency of appearance in the statistics. Filtering in this manner will essentially make reverse proxy web server 306 self-optimizing. Optimizing, in this case, means the adjustment of the pre-fetch directives allowed resulting in a change in the utilization metrics.

Reverse proxy web server 306 is able to adapt to detected user usage patterns dynamically, as the patterns change. Setting predefined thresholds provides more control by the reverse proxy web server 306 over the server itself by controlling/adjusting which of the pre-fetch directives coded into the web applications will be used at any given time, based on the resource utilization of the reverse proxy web server 306. The management of the proxy server is then dynamic because the changes that occur are driven by the load and type of load on the proxy server.

Figure 5:
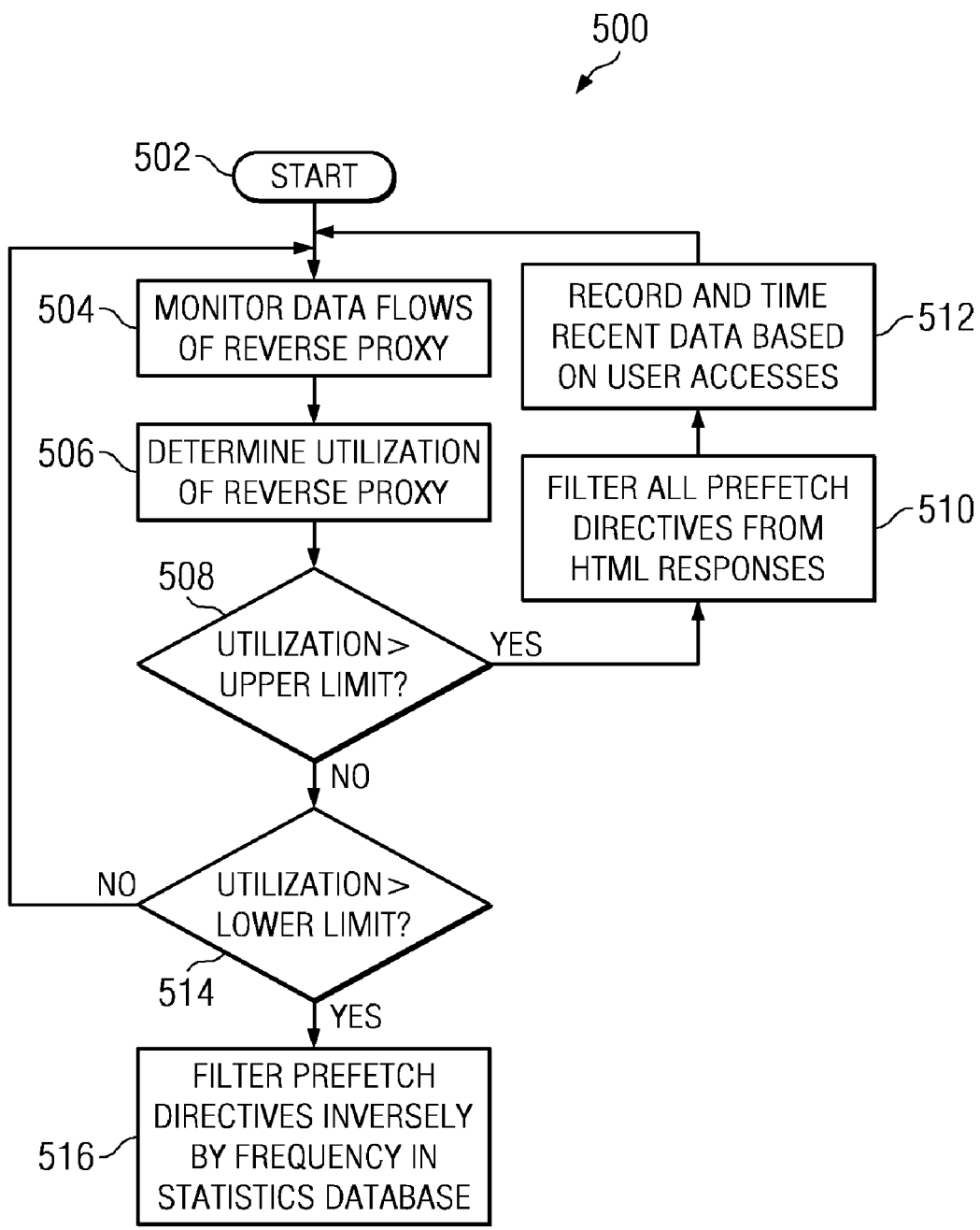
FIG. 5 is a flowchart of a process using the pre-fetch extensions of FIG. 4, in accordance with illustrative embodiments.

With reference to FIG. 5, a flowchart of a process using pre-fetch extensions of FIG. 4, in accordance with illustrative embodiments is shown. Process 500 is an example of a process using reverse proxy web server 306 of FIG. 3 incorporating pre-fetch filtering extensions 416 of FIG. 4 to better manage resource utilization. Process 500 starts (step 502) and monitors data flows of the reverse proxy (step 504). Data flows being monitored include various Hypertext Markup Language tags and, more specifically, link tags. A determination of the utilization of the reverse proxy machine is then made (step 506). The calculated resource utilization value is an indication of load versus capacity of the reverse proxy. The data in a statistical database is analyzed to form usage statistics, wherein the usage statistics are compared with thresholds of performance criteria within a pre-fetch decision engine. Resource utilization information is determined based on one of a set of resource utilizations including a number of active sessions, a number of pending requests, processor utilization, memory utilization and network utilization, to form resource usage from the data captured in the statistical database. Resource utilization of the reverse proxy web server is then determined from the resource usage.

A determination as to whether a resource utilization upper limit has been reached is then made (step 508). The upper limit may be a set predetermined value or may be a value that is adjusted based on established criteria. For example, there may be a set predetermined value equal to eighty percent of the machine processor capacity as the general criteria. In another example, the setting may be at fifty percent utilization for a period of 8 hours between 9 AM and 5 PM.

When the resource utilization is greater than the upper limit, a "yes" result is obtained. When the utilization is not greater than the upper limit, a "no" result is obtained. When a "yes" is obtained in step 508, a filter of all pre-fetch directives from Hypertext Markup Language responses is performed (step 510). This activity serves to reduce the load on the reverse proxy system by constraining the pre-fetch activity.

Record and time recent data based on user access is performed to capture current user based statistics (step 512). Capturing the user based data now ensures that statistical data is current and therefore more effective when making load balancing decisions. The use of a sliding window ensures the data captured and analyzed is relevant to the current operational loads on the system. Process 500 then loops back to step 504.

When a "no" result is obtained in step 508, a determination is made whether resource utilization is greater than a lower limit (step 514). When resource utilization is greater than a lower limit, a "yes" result is obtained. When resource utilization is not greater than a lower limit, a "no" result is obtained. When a "yes" result is obtained in step 514, filter pre-fetch directives inversely by frequency in the statistics database is performed (step 516). When a "no" result is obtained in step 514, resource utilization is below the lower limit and available capacity may be used, thereby allowing more link tags to be used. No filtering of tags is performed at this time. Process 500 then loops back to step 504.

Dynamic filtering of the link tags may balance the user experience and application wait time with the capabilities of the shared infrastructure hosting the reverse proxy web server. Illustrative embodiments provide a capability for optimal and dynamic use of the web application design capability in an environment with a reverse proxy without sacrificing fairness of use of the reverse proxy and the hardware on which it runs. For example, when load increases to exceed a threshold, filtering all pre-fetch directives from the Hypertext Markup Language responses occurs to drive the resource utilization downward. When load on the reverse proxy is between an upper limit and a lower limit, or threshold, filtering of pre-fetch directives inversely by frequency determined from the statistics database is performed to dynamically adjust the resource utilization. When resource utilization is less than a lower limit, no filtering occurs because capacity is available to allow more link tags to be processed.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamic management of resource utilization, the computer implemented method comprising:
    monitoring, by a reverse proxy web server, data flows of a reverse proxy web server;
    determining, by the reverse proxy web server, whether a resource utilization of the reverse proxy web server exceeds a first threshold;
    responsive to a determination that the resource utilization does exceed the first threshold, filtering, by the reverse proxy web server, all pre-fetch directives from hyper text markup language responses and recording and timing recent data, based on user accesses of the reverse proxy web server;
    responsive to a determination that the resource utilization does not exceed the first threshold, determining, by the reverse proxy web server, whether the resource utilization exceeds a second threshold;
    responsive to a determination that the resource utilization exceeds the second threshold, filtering, by the reverse proxy web server, the pre-fetch directives from the hyper text markup language responses inversely by frequency; and
    responsive to a determination that the resource utilization does not exceed the second threshold, returning to monitor the data flows of the reverse proxy web server.

2. The computer implemented method of claim 1, wherein determining whether a resource utilization exceeds a first threshold further comprises:
    analyzing data in a statistical database to form usage statistics, wherein the usage statistics are compared with thresholds of performance criteria within a pre-fetch decision engine.

3. The computer implemented method of claim 1, wherein determining whether resource utilization does exceed a first threshold comprises:
    determining resource utilization information based on one of a set of resource utilizations including a number of active sessions, a number of pending requests, processor utilization, memory utilization and network utilization, to form resource usage; and
    determining resource utilization of the reverse proxy web server from the resource usage.

4. The computer implemented method of claim 1 further comprising:
    responsive to a determination that resource utilization does exceed a first threshold, recording and timing recent data, based on user accesses of the reverse proxy web server.

5. A data processing system for dynamic management of resource utilization, the data processing system comprising:
    a bus;
    a memory connected to the bus, wherein the memory comprises computer-executable instructions;
    a communications unit connected to the bus;
    a display connected to the bus; and a processor unit connected to the bus, wherein the processor unit executes the computer-executable instructions to direct the data processing system to:

monitor data flows of a reverse proxy web server;

determine whether a resource utilization of the reverse proxy web server exceeds a first threshold;

responsive to a determination that the resource utilization does exceed the first threshold, filter, by the reverse proxy web server, all pre-fetch directives from hyper text markup language responses and record and time recent data, based on user accesses of the reverse proxy web server;

responsive to a determination that the resource utilization does not exceed the first threshold, determine whether the resource utilization exceeds a second threshold;

responsive to a determination that the resource utilization exceeds the second threshold, filter pre-fetch directives from hyper text markup language responses inversely by frequency; and responsive to a determination that the resource utilization does not exceed the second threshold, returning to monitor the data flows of the reverse proxy web server.

6. The data processing system of claim 5, wherein executing the computer-executable instructions to determine whether a resource utilization exceeds a first threshold directs the data processing system to:

analyze data in a database to form usage statistics, wherein the usage statistics are compared with thresholds of performance criteria within a pre-fetch decision engine.

7. The data processing system of claim 5, wherein executing the computer-executable instructions to determine whether resource utilization does exceed a first threshold directs the data processing system to:

determine resource utilization information based on one of a set of resource utilizations including a number of active sessions, a number of pending requests, processor utilization, memory utilization and network utilization, to form resource usage; and determine resource utilization of the reverse proxy web server from the resource usage.

8. The data processing system of claim 5, wherein executing the computer-executable instructions to respond to a determination that resource utilization does exceed a first threshold directs the data processing system to:

filter all pre-fetch directives from Hyper Text Markup Language formatted responses; and record and time recent data based on user accesses of the reverse proxy web server.

9. A computer program product for dynamic management of resource utilization, the computer program product comprising non-transitory computer-readable recordable-type medium tangibly embodying computer-executable instructions thereon, the computer-executable instructions comprising:

computer-executable instructions for monitoring data flows of a reverse proxy web server;

computer-executable instructions for determining whether a resource utilization of the reverse proxy web server exceeds a first threshold;

computer-executable instructions responsive to a determination that the resource utilization does exceed the first threshold, for filtering all pre-fetch directives from hyper text markup language responses and for recording and timing recent data, based on user accesses of the reverse proxy web server;

computer-executable instructions responsive to a determination that the resource utilization does not exceed the first threshold, for determining whether the resource utilization exceeds a second threshold;

computer-executable instructions responsive to a determination that the resource utilization exceeds the second threshold, for filtering pre-fetch directives from hyper text markup language responses inversely by frequency; and computer-executable instructions responsive to a determination that the resource utilization does not exceed the second threshold, for returning to monitor the data flows of the reverse proxy web server.

10. The computer program product of claim 9, wherein computer-executable instructions for determining whether a resource utilization exceeds a first threshold comprises:

computer executable instructions for analyzing data in a database to form usage statistics, wherein the usage statistics are compared with thresholds of performance criteria within a pre-fetch decision engine.

11. The computer program product of claim 9, wherein computer-executable instructions for determining whether a resource utilization does exceed a first threshold comprises:

computer-executable instructions for determining resource utilization information based on one of a set of resource utilizations including a number of active sessions, a number of pending requests, processor utilization, memory utilization and network utilization, to form resource usage; and computer-executable instructions for determining resource utilization of the reverse proxy web server from the resource usage.

12. The computer program product of claim 9, wherein computer-executable instructions responsive to a determination that resource utilization does exceed a first threshold comprise:

computer-executable instructions for filtering all pre-fetch directives from Hyper Text Markup Language formatted responses; and computer-executable instructions for recording and timing recent data based on user accesses of the reverse proxy web server.

* * * * *